Dec. 22, 1959          P. AGRILLO          2,917,839
CHANGEABLE EXHIBITOR HAVING A PLURALITY OF INDEPENDENT
MANUALLY MOVABLE TAPES CARRYING
EDUCATIONAL INDICIA
Filed Sept. 25, 1956          2 Sheets-Sheet 1
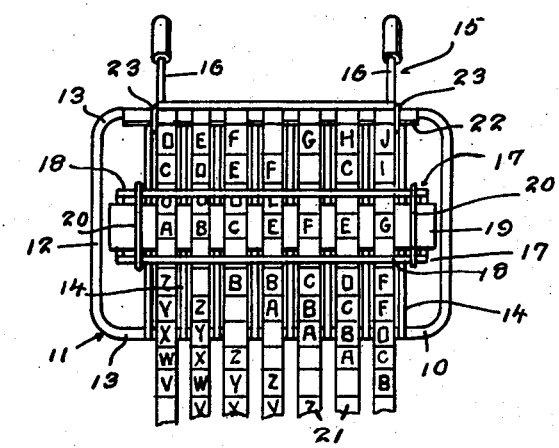
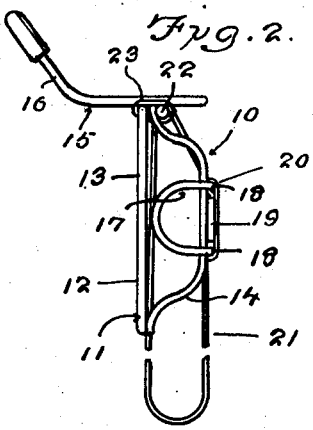
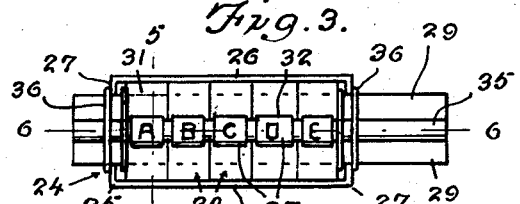
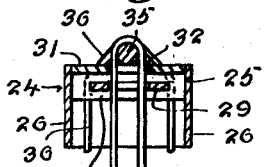
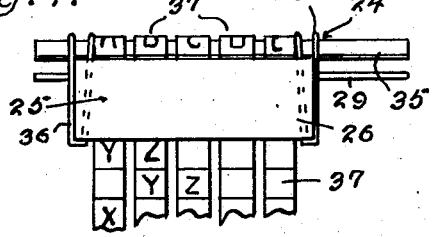
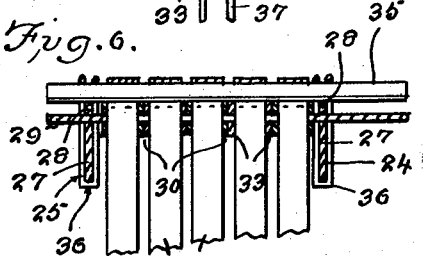
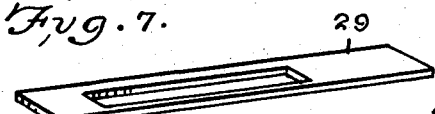
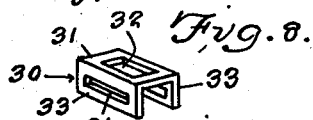
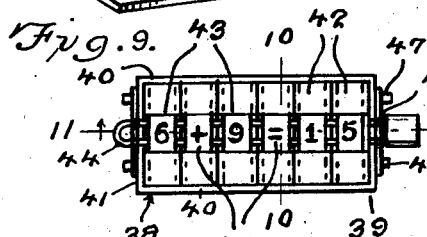
INVENTOR.
Paul Agrillo
BY Victor J. Evans & Co.
ATTORNEYS

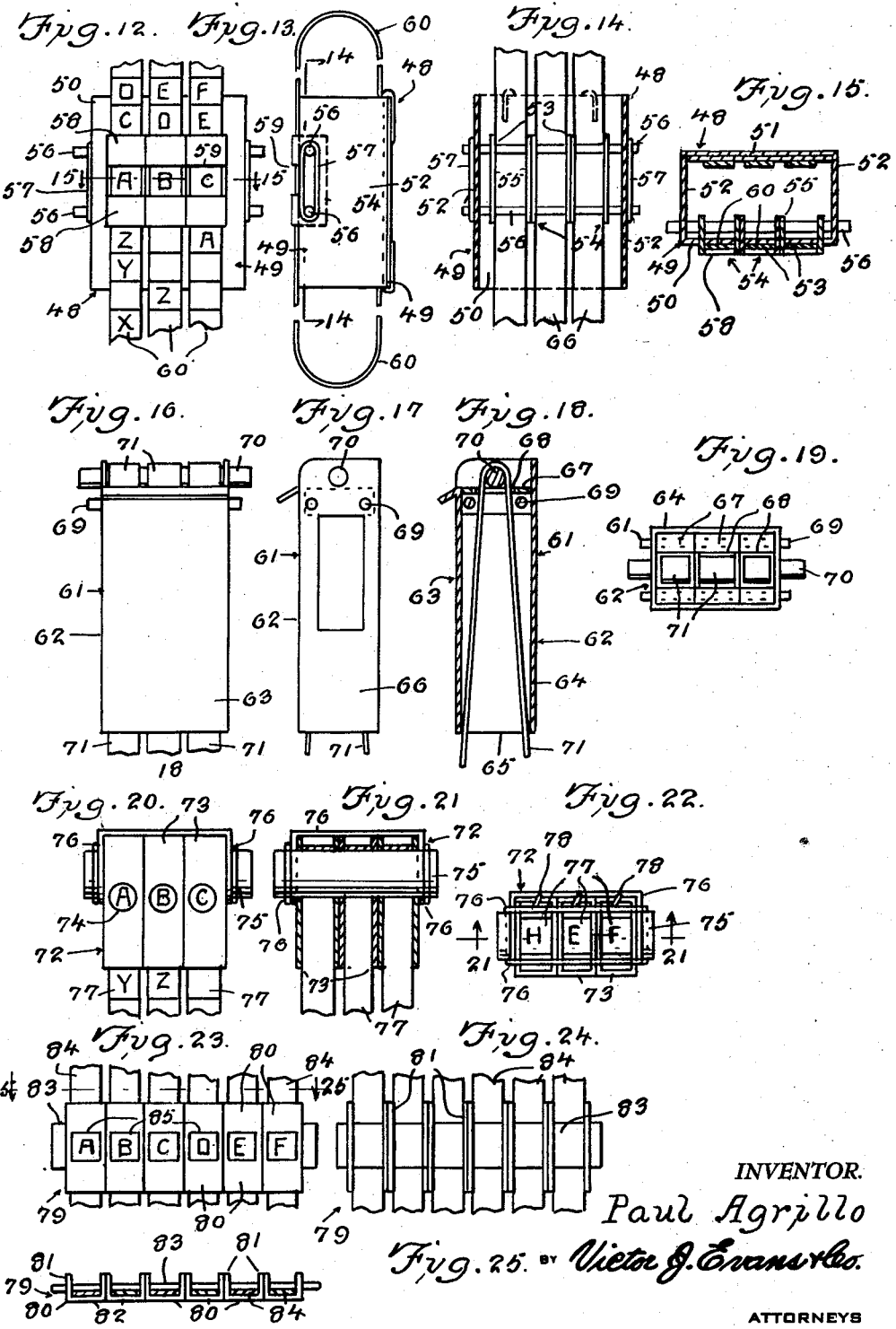

United States Patent Office 2,917,839
Patented Dec. 22, 1959

2,917,839

CHANGEABLE EXHIBITOR HAVING A PLURALITY OF INDEPENDENT MANUALLY MOVABLE TAPES CARRYING EDUCATIONAL INDICIA

Paul Agrillo, Gilroy, Calif.

Application September 25, 1956, Serial No. 612,004

1 Claim. (Cl. 35—76)

This invention relates to a changeable exhibitor.

The object of the invention is to provide a changeable exhibitor which is adapted to be used for teaching children or other persons the letters of the alphabet, as well as the correct spelling of words, and the use of numerals.

Another object of the invention is to provide a changeable exhibitor which is adapted to be used for educational or amusement purposes by children or other persons, the changeable exhibitor of the present invention including a plurality of movable tapes or bands which are adapted to be manually moved by the user of the device, the tapes being provided with a plurality of letters or numbers thereon so that by moving the tapes independently of each other different arrangements of letters, words or numerals can be provided whereby a person can learn to spell, count or the like.

A further object of the invention is to provide a changeable exhibitor which is extremely simple and inexpensive to manufacture.

Other objects and advantages will be apparent during the course of the following description.

In the accompanying drawings, forming a part of this application, and in which like numerals are used to designate like parts throughout the same.

Fig. 1 is a top plan view showing a changeable exhibitor constructed according to the present invention.

Figure 2 is a side elevational view of the device of Figure 1.

Figure 3 is a top plan view of a modified exhibitor.

Figure 4 is a side elevational view of the exhibitor shown in Figure 3.

Figure 5 is a sectional view taken on the line 5—5 of Figure 3.

Figure 6 is a sectional view taken on the line 6—6 of Figure 3.

Figure 7 is a perspective view illustrating a plate for use with the exhibitor of Figures 3 through 6.

Figure 8 is a perspective view illustrating a bracket for use with the exhibitor of Figures 3 through 6.

Figure 9 is a top plan view of a further modified exchangeable exhibitor.

Figure 10 is a sectional view taken on the line 10—10 of Figure 9.

Figure 11 is a sectional view taken on the line 11—11 of Figure 9.

Figure 12 is a fragmentary plan view illustrating a still further modified changeable exhibitor.

Figure 13 is a view taken at right angles to the view shown in Figure 12.

Figure 14 is a sectional view taken on the line 14—14 of Figure 13.

Figure 15 is a sectional view taken on the line 15—15 of Figure 12.

Figure 16 is an elevational view illustrating a still further modified changeable exhibitor.

Figure 17 is a view taken at right angles to the view shown in Figure 16.

Figure 18 is a sectional view taken on the line 18—18 of Figure 16.

Figure 19 is a top plan view of the exhibitor shown in Figures 16 through 18.

Figure 20 is a front elevational view of a still further modified changeable exhibitor.

Figure 21 is a sectional view taken on the line 21—21 of Figure 22.

Figure 22 is a top plan view of the changeable exhibitor shown in Figures 20 and 21.

Figure 23 is a fragmentary plan view illustrating a still further modified changeable exhibitor.

Figure 24 is a rear view of the device shown in Figure 23.

Figure 25 is a sectional view taken on the line 25—25 of Figure 23.

Referring in detail to the drawings, and referring more particularly to Figures 1 and 2 of the drawings, there is shown a changeable exhibitor which is indicated generally by the numeral 10 and the exhibitor 10 is adapted to be used for teaching a child or other person how to spell or the letters of the alphabet or the like. The exhibitor 10 includes a frame 11 which may have a rectangular shape, and the frame can be made of any suitable material such as metal. The frame 11 includes spaced parallel side portions 13 and spaced parallel end portions 12. Extending between the pair of side portions 13 and secured thereto in any suitable manner, as for example, by welding is a plurality of spaced parallel bars 14. There is further provided a support member which is indicated generally by the numeral 15, and the support member 15 includes a pair of spaced parallel legs 16 which are secured to a side portion 13 of the frame 11 in any suitable manner. By means of the support member 15 the device can be supported in an inclined position so as to facilitate the use thereof. The changeable exhibitor 10 further includes a body member which is indicated generally by the numeral 17, the body member 17 includes a pair of spaced parallel arms 18 which are arranged at right angles with respect to the bars 14, and the arms 18 may be secured to the bars 14 in any suitable manner, as for example by welding. Interposed between the pair of arms 18 and extending transversely across the bars 14 is a plate or strip 19, and suitable bands, such as the resilient or rubber bands 20 extend between the arms 18 and across the plate 19 for retaining the plate 19 in place. There is further provided a plurality of spaced parallel manually movable tapes or bands 21 which each have indicia thereon and the indicia may be letters of the alphabet, numerals or the like. Thus, by manually gripping the tapes 21 and moving the tapes, different letters can be brought into position between the arms 18 so that the user can learn the letters of the alphabet as well as how to spell. Since the tapes 21 can be readily manually moved, different arrangement of letters can be readily provided so that the device can be used to increase proficiency with the letters of the alphabet. A guide rod 22 is arranged contiguous to one of the sides of the frame 11, so as to help maintain the tapes 21 in their proper position as they are moved, and the guide rod 22 may be retained in place by rubber bands 23.

Referring to Figures 3 through 8 of the drawings there is shown a modified changeable exhibitor which is indicated generally by the numeral 24. The changeable exhibitor 24 includes a rectangular open frame 25 which is provided with spaced parallel side members 26 and spaced parallel end members 27. The end members 27 of the frame 24 are provided with cutouts 28, Figure 6, and a rectangular plate or strip 29 supported by the frame 25 extends through the cutouts 28. Positioned within the frame 25 is a plurality of U-shaped brackets 30, Figure 8. Each bracket 30 includes a top wall 31 which is provided with an opening 32 therein. Each bracket 30 further includes a pair of spaced parallel side walls 33, and the side walls 33 have slots or openings 34 therein for the projection therethrough of the plate 29. A tube or rod 35 extends across the tops of the brackets 30, and the rod 35 is held in place by rubber bands 36. There is further provided a plurality of tapes or bands 37 which are adapted to be manually moved, and the tapes 37 have indicia such as letters of the alphabet thereon, the tapes 37 extending downwardly through the openings 32 in the top wall 31 of the bracket 30. Thus, by manually gripping and moving the tapes 37, different arrangements of letters can be exposed above the rod 35 so that the device can be used for providing education and amusement or recreation to the user.

Referring to Figures 9, 10 and 11 of the drawings, there is shown a further modified changeable exhibitor which is indicated generally by the numeral 38, and the exhibitor 38 includes a rectangular open frame 39 which includes side members 40 and end members 41. Supported within the frame 39 is a plurality of brackets 42 which are provided with openings 43 in the tops thereof. A substantially U-shaped body member 44 extends across the top of the frame 39, and the body member 44 includes a pair of spaced parallel arms 45 which serve to support a plurality of manually movable tapes 46. The tapes 46 extend downwardly through the openings 43 in the brackets 42, and the tapes 46 may have indicia such as numerals and various symbols used in arithmetic thereon so that the user can become more proficient in the various problems connected with arithmetic or the like. A pair of spaced parallel rods 47 extend through the ends of the device as shown in Figures 9 through 11. Instead of having the numerals on the tapes 46, it is to be understood that the previously described letters of the alphabet can be arranged thereon.

Referring to Figures 12 through 15 of the drawings, there is shown a further modified changeable exhibitor which is indicated generally by the numeral 48, and the changeable exhibitor 48 includes a hollow frame or housing 49. The frame 49 includes a front and rear member 50 and 51 and spaced parallel side members 52. The front member 50 and the frame 49 is provided with a plurality of slots 53, and there is further provided a plurality of U-shaped brackets 54 which include side walls or legs 55 that extend through the slots 53. A pair of rods 56 extend through the sides 52 of the frame 49 and through the side walls 55 of the brackets 54 for retaining or maintaining the brackets 54 connected to the frame. Rubber bands 57 are arranged in engagement with the rods 56 for maintaining the rods 56 in their proper position. The brackets 54 further include a front wall 58 which is provided with a window 59, the plurality of windows 59 being arranged in alignment with respect to each other. There is further provided a plurality of manually movable tapes or bands 60 which have indicia thereon such as letters of the alphabet, and the tapes 60 are movably mounted between the front walls 58 of the brackets 54, and the front 50 of the frame 49, and the letters on the tapes 60 are adapted to be observed through the windows 59 in the brackets.

Referring to Figures 16 through 19 of the drawings, there is shown a still further modified changeable exhibitor which is indicated generally by the numeral 61, and the exhibitor 61 includes a hollow frame or housing 62 which is provided with front and rear portions 63 and 64 and side portions 65 and 66. Mounted in the upper portions of the frame 62 is a plurality of U-shaped brackets 67 which are provided with openings 68 through the tops thereof, and the openings 68 define aligned windows. A pair of spaced parallel rods 69 extend through the sides of the frame and through brackets 67 for maintaining the brackets 67 in place in the frame. There is further provided a rod or bar 70 which extends through the upper ends of the sides of the frame, and a plurality of tapes or bands 71 are trained over the rod 70, the tapes 71 adapted to have indicia such as noted in the alphabet thereon. The tapes 71 extend downwardly through the openings 68 in the brackets 67 and as shown in Figures 16 through 18, the lower ends of the tapes 71 extend beyond the bottom of the frame so that the lower ends of the tapes can be readily manually gripped to thereby move the tapes.

Referring in detail now to Figures 20, 21 and 22 of the drawings there is shown a further modification wherein there is shown a changeable exhibitor which is indicated by the numeral 72. The exhibitor 72 includes a plurality of frames 73 which are arranged in side by side relation with respect to each other, and all of the frames 73 are provided with circular openings 74 which define aligned windows for a purpose to be later described. A tube or rod 75 extends through all of the frames 73, and rubber bands 76 connect the frames together and also connect the frames to the tubes 75. Movably mounted in each frame 73 is a tape or band 77 which has indicia thereon, and the tapes are trained over the tubes 75, the indicia on the tapes 77 being adapted to be observed or seen through the windows 74. Suitable clips 78 may be used for securing together the adjacent portions of the frame 73. Thus, by manually moving the tape 77 different numerals or letters can be exposed through the openings 74 so that the user can learn to spell or learn the letters of the alphabet.

In Figures 23, 24 and 25, there is shown a further modified changeable exhibitor which is indicated generally by the numeral 79. The exhibitor 79 includes a plurality of brackets 80 of U-shape, and the brackets 80 are arranged in side by side relation with respect to each other and each includes a pair of spaced parallel legs 81 and a web 82. A plate 83 extends through all of the legs 81 of the brackets. The webs 82 of the brackets 80 are provided with openings which define windows 85 whereby manually operated tapes 84 can be observed through the windows.

From the foregoing it is apparent that there has been provided a device which is especially suitable for use in teaching a person such as a child how to spell or how to count. When using the device shown in Figures 1 and 2, the tapes 21 can be manually gripped and moved so as to bring different ones of the letters in registry with the space between the arms 18 of the body members 17. Thus, different words can be spelled out and since the plurality of tapes 21 can be manually moved independently of each other, many different variations in the spelling of the words can be accomplished. The support member 15 can be used to help support the device in an inclined position so that the tapes 21 can be more easily moved. The rod 22 helps guide the movable tapes 21, and the plate 19 provides a support for the moving tapes 21 which travel between the bars 14.

Referring to Figures 3 through 8 of the drawings there is shown the modified exhibitor which is indicated generally by the numeral 24. In Figure 7 it will be seen that the plate 29 is provided with a slot whereby the tapes 37 can extend therethrough when the device is assembled. When using the device shown in Figures 4 through 8, the tapes 37 can be manually pulled so that different combinations of letters will be exposed above the tubes 35 as shown in Figure 3 so that the user will be able to learn to spell or the like. The tube 35 is maintained in its proper position by means of the rubber bands 36, and there is further provided a plurality of brackets 30 which are maintained in their proper position within the frame 25.

In Figures 9, 10 and 11 there is shown a further modification which is indicated generally by the numeral 38, and in these figures the tapes 46 can be manually moved so as to bring different portions of the tapes into view through the openings or windows 43. As shown in Figure 9 the tape 46 may be provided with numerals and arithmetic symbols thereon so that a child or other person can learn arithmetic with the device of the present invention. Since the tapes can be moved, different combinations of problems can be set up and worked.

In Figures 12 through 15 of the drawings there is shown a still further modification wherein the tapes 60 are adapted to be manually moved so as to bring different letters on the tapes into view or registry through the windows 59. Thus, different arrangements of letters can be exposed for educational or recreational purposes. The pair of rods 56 maintain the brackets 54 in their proper assembled position in the device.

Referring to Figures 16 through 19, there is shown a still further modification which includes movable tapes 71 which are adapted to have any suitable indicia thereon. By moving the tapes 71, the indicia on the tapes can be changed so that different combinations of letters or numbers will appear in the intermediate portions thereof shown in Figure 19.

In Figures 20 through 22 there is shown a modification wherein the tapes 77 can be manually moved so that different indicia such as the letters A, B, and C can be exposed through the windows 74.

In Figures 23 through 25 the modification 79 is constructed so that the tapes 84 can be moved to bring different letters or indicia into view as shown in Figure 23.

The device can be made of any suitable material and in any shape or size, and the parts can be secured together in any suitable manner, as for example, adhesive can be used. To operate the device, the fingers can be used to pull the various tapes. The device is extremely simple to make and the device can be used as a toy or for amusement purposes or else it can be used for instruction purposes. The tapes may be provided with blank spaces where desired between certain of the letters so that several words can be spelled with a blank space therebetween. Also, the arrangement of the letters or numerals on the tapes can be varied as desired. In the event that any of the parts, such as the tapes, are to be replaced, the device can be readily disassembled.

I claim:

In a changeable exhibitor, a rectangular frame including spaced parallel end sections and spaced parallel side sections, a plurality of spaced parallel bars extending between said side sections and secured thereto, a support member including a plurality of spaced parallel legs secured to said frame, a body member including a pair of spaced parallel arms extending transversely with respect to said bars and secured thereto, a flat plate extending across said bars and arranged between said arms, rubber bands extending between said arms and arranged over said plate, a rod supported by said bars and arranged contiguous to one of said side sections, and a plurality of manually movable tapes extending over said plate and below said arms, said tapes having indicia thereon such as numerals or letters of the alphabet.

References Cited in the file of this patent

UNITED STATES PATENTS

| | | |
|---|---|---|
| 500,824 | Von Tassel | July 4, 1893 |
| 778,092 | Willson | Dec. 20, 1904 |
| 853,042 | Thomson | May 7, 1907 |
| 2,740,206 | Schatz | Apr. 3, 1956 |